Figure 5:

Aug. 22, 1967     E. H. FLAMING     3,336,657

SCARFING TOOL AND METHOD FOR JOINING METAL BANDS

Filed Sept. 14, 1964

INVENTOR.
E. H. FLAMING

BY *Young + Quigg*
ATTORNEYS

United States Patent Office 3,336,657
Patented Aug. 22, 1967

3,336,657
SCARFING TOOL AND METHOD FOR JOINING METAL BANDS
Edwin H. Flaming, Bartlesville, Okla., assignor to Phillips Petroleum Company, a corporation of Delaware
Filed Sept. 14, 1964, Ser. No. 395,999
6 Claims. (Cl. 29—482)

This invention relates to an apparatus for treating the cross-sectional area of metal belts and to a method of joining two such treated cross sectional areas. In one aspect, this invention relates to a tool for scarfing the end of a thin metal band. In another aspect, it relates to a method of overlapping two such scarfed ends and joining them so that the resulting joint displays qualities and characteristics comparable to those of the metal band itself.

Continuous metal belts for use in conjunction with high speed pulley drive systems have found numerous applications in contemporary industry. The high tensile strength of metals such as steel is one of the principal characteristics which promote use of such materials in fabrication of the belts. This high tensile strength permits the use of very small cross sectional areas in the belt design for transfer of the pulley system forces. This small cross sectional area eliminates a number of otherwise significant engineering problems in pulley systems such as gravity effect and system imbalances caused by inertia. Other properties of metal belts which have recently added appreciably to their utility are their excellent heat and electrical conductivities. For example, thin metal bands are finding increasing application in mechanisms designed to package manufactured articles in air-tight containers of heat sensitive thermoplastic resins. Operating requirements of the metal bands in these mechanisms often require cyclic heating and cooling and simultaneous high speed flexing. This combination of actions required of the metal band, namely cyclic heating and cooling and high speed flexing, are extremely detrimental to the fabricated points of juncture by which the metal bands are made continuous. Presently known methods of joining the opposing ends of steel bands are not capable of producing a joint with a satisfactory life span under the prescribed operating conditions.

It is an object of this invention to provide a method of joining the ends of steel bands which will result in a joint of superior strength and durability.

It is another object of this invention to provide a tool to be used in preparing the ends of steel bands for joining.

It is still another object of this invention to provide a joint for steel bands which lends itself to repeated heating and cooling and to rapid and continuous flexing.

Other objects of this invention will become apparent to those skilled in the art from reading this specification.

It is shown in the art that the ends of metal bands may be joined by overlapping the scarfed edges of two such ends and applying adhesive to the opposing contact surfaces. I have found that in joining the ends of metal bands having a thickness between 0.001 inch and 0.05 inch the resulting joint will display increased strength when the opposing overlapping ends have certain geometrical characteristics. My experimentation and study have shown that the steel band joint of greatest strength is obtained when the hypotenuse dimension of the right triangle seen when viewing the scarfed edge from either side is equal in length to approximately 10 times the thickness of the bands to be joined. In other words, the most desirable scarf is equal in cross sectional area to very nearly 10 times the cross sectional area of the band. The scarfed end having this geometry has a most desirable combination of qualities, among which are a surface area greatly multiplied over the band cross sectional area for applying adhesive material to effect the joint together with a protruding edge of the scarf which is not so thin as to be delicate or brittle. After arriving at this scarf geometry, there is a need for a means of expediently reproducing the desired scarfed edge with suitable properties for immediate joining. Means designed to effect such a reproduction simply and effectively are further aspects to be disclosed in this invention.

The tool designed to effect the scarfing of the steel band end consists primarily of a shearing or mashing head whose forward surface is a chisel-like edge. The shearing edge slides in an enclosed channel and is confronted at its forward surface by a transverse, stationary, flat plate. A slot of suitable dimensions is provided by which the metal band to be scarfed may be inserted in the proper position in relation to the channel and flat plate members mentioned above. The chisel-like edge of the shearing head is then advanced to contact the surface of the metal band and slow, continuous force sufficient to push the chisel edge of the mashing head through the metal band is applied longitudinally to the shearing member. The chisel-like edge "mashes" the metal band apart and a scarfed surface results both at the end of the remaining metal belt and the end of the opposing waste material which may be discarded. The fresh surface produced by this mashing has a number of qualities which lend the surface to immediate treatment for joining, among which are the practically total absence of metal oxides which normally inhibit surface bonding. Since the mechanism described to this point has no characteristics which definitely insure that the length of the scarfed edge will equal about 10 times the band thickness, the required characteristics of the chisel-like edge will now be disclosed.

I have found that the apex angle of the mashing edge must be within a certain range of obtuse angles, and it is further limited by definite and distinguishable ranges of values for the band side angle and for the waste side angle. The scarfing tool may best be described and understood by referring to the accompanying drawings.

Figure 6:
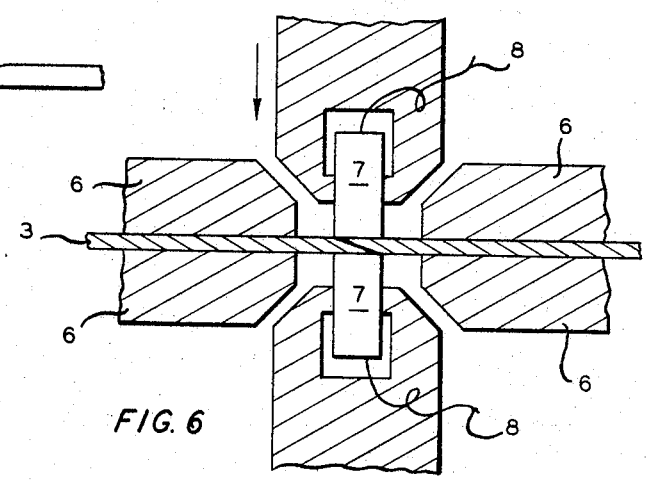
Figure 1:
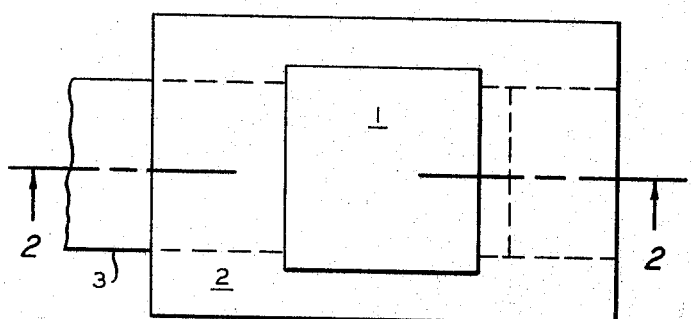
Figure 3:
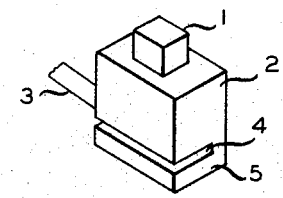
Figure 2:
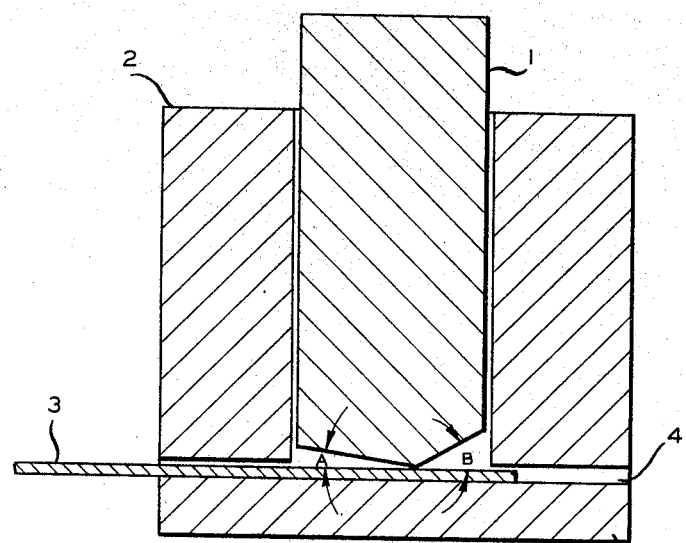
Figure 4:
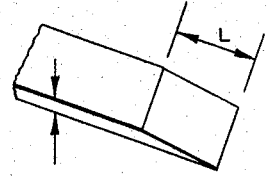

FIGURE 1 is a view of the scarfing tool from the top.
FIGURE 2 is a cross sectional view of the scarfing tool as seen when viewed along section 2 of FIGURE 1.
FIGURE 3 is a three-dimensional perspective view of the scarfing tool showing a possible design of the stationary members, the sliding mashing head, and the slot for insertion of the metal band.
FIGURE 4 shows a perspective view of a scarfed band end made according to this invention in which L equals about 10t.
FIGURE 5 is a side view of two over-lapped scarfed band ends with the thin strip of silver solder 9 inserted.
FIGURE 6 is a side view of a simply designed clamping, pressing, and heating apparatus for joining band ends according to this invention.

The critical geometry of the chisel-head surface as described above may be seen in FIGURE 2. The angle referred to above as the band side angle is angle A and the angle referred to above as the waste side angle is angle B. My experimentation has shown that in order to accomplish reproduction of the desirable scarfed edge on steel bands, angle A of the chisel-head surface must lie in the range of 6–10° and angle B must lie in the range of 25–30°. The shearing head member should be fabricated of a material of sufficient hardness to retain this specific geometry at its chisel-head surface while being used repeatedly in the mashing operation. Should angle B be made greater than 30° it would cause a resultant force during the mashing operation in the longitudinal direction of the band which would tend to break the band by a tensile fracture before the chisel edge is able to effect a smooth, scarfed surface across the thickness of the band. Should angle B be made less than 25° it would contribute an unnecessary retarding force during the shearing operation. As for angle A, the smaller angle is needed to "mash" and cold-form the scarfed surface during the operation, and to yield the scarfed end of proper geometry.

If angle A is greater than 10°, the scarfed surface will not be as wide as ten times the band thickness. Neither will the band end be cold-formed as is desirable. If angle A is made smaller than 6°, the band end is cold-formed to too great an extent, and flaws of thinness and brittleness develop in the scarf protrusion.

The force which is to be applied to the shearing head to effect the parting and scarfing of the steel band should be sufficient to accomplish the operation expediently. However, it should be noted that according to the best manner of practicing this invention the applied force should not be one of rapid impact. The most apt description of the force to be applied would be that exerted by the jaws of a substantial vice advanced by a deliberate mechanical means.

The method of joining the ends of the steel bands consists of the following procedure. Two opposing scarfed edges as shown in FIGURE 5 are each gripped rigidly by clamping means 6 as shown in FIGURE 6. A thin strip of silver solder, for example about 0.003 inch thick when the band thickness is about 0.005 inch, is placed between the opposing contact surfaces, and two opposing members 7 are advanced to contact either side of the juncture. The two opposing members 7 are capable of compressing the joint and assuring intimate contact of all surfaces while at the same time each member 7 is electrically wired 8 and supplies heat to the juncture sufficient to melt the silver solder and effect the brazing of the surfaces. When the brazing of the joint is complete and the heating and compressing members are retracted, the jointed band 3 is removed from the clamping means 6, and the joint is placed between opposing flat surfaces which apply high pressure to the juncture, sufficient to reduce the thickness of the juncture to the uniform dimensions of the band. When this compressing operation is complete any excess material is trimmed away so that the resulting joint is clean and smooth. The joint is now ready for service.

The advantages offered by this invention are numerous and will be apparent to those skilled in the art. This scarfing tool gives a means for preparing band ends for joining which is exact and uniform in producing a high quality joint. The entire joining process is both simple and expedient in operation. Continuous metal bands with joints prepared according to techniques disclosed by this invention have displayed surprisingly long service lives when run at high speeds on heat sealing machines being used in conjunction with polyethylene packaging machines. Steel bands joined according to the previously best known method had service lives on such machines of no more than 3–4 days. Similar bands joined according to the method of this invention serve under similar operating conditions for periods exceeding one month.

I claim as my invention:

1. An apparatus for scarfing the ends of thin metal bands which comprises a sturdy metal member having its forward cross sectional surface machined or shaped to form a wedge or chisel-head, said chisel-head surface being of such a design that sloping sides meet in a straight line crest, said crest being of geometrical proportions such that one side of said crest slopes at an angle of 6–10° and on the opposite side of said crest the surface slopes at an angle of between 25–30° from the surface of the cross section of said chisel-head, means for advancing and retracting said member along its longitudinal axis through rigid channel guides to contact said wedge point or chisel-head surface with the broad surface of a transversely oriented metal band, and means to transmit force and direct the chisel-head surface against the metal band with said force so that the metal band is parted by said chisel-head and the resulting sheared end of said metal band has a smooth scarfed or chamfered surface.

2. An apparatus for scarfing the ends of thin metal bands comprising an enclosed channel, a sturdy metal member capable of advancing and retracting in and being guided by said enclosed channel, a wedge-like or chisel-head surface on the forward, cross sectional face of said metal member, said chisel-head surface being of such design that the sloping sides meet in a straight-line crest which runs squarely with the shanks of said metal member, said crest or apex angle being of geometrical proportions such that to one side of said crest the surface slopes at an angle of 6–10° and on the opposite side of said crest the surface slopes at an angle between 25–30° from the surface of the cross section, a flat plate at the forward end of said channel which squarely and rigidly impedes the further advance of said chisel-head surface, slots positioned in opposite sides of said channel directly above and parallel to said flat plate which allow insertion of a metal band across the channel and flush against the surface of said flat plate, said metal band being oriented in such a direction by the slot that said chisel-head surface when contacted with the surface of said metal band spans the width of said metal band squarely, and means to transmit a force through said metal member so that said chisel-head surface presses said metal band against said flat plate in such a manner that said metal band is sheared and a smooth uniform scarfed surface whose area closely approximates ten times the cross sectional area of said metal band results on the end of said metal band.

3. A method for scarfing the end of a thin metal band which comprises pressing said thin metal band against a rigid back-up surface with a wedge-like, chisel-head surface, said wedge-like surface being sloped toward one extremity at an angle of 6–10° and sloped toward the opposite extremity at an angle of 25–30°, in such a manner that said thin metal band is sheared squarely relative to its width extremities and the resulting fresh surface on the end of said thin metal band is scarfed at such a slope that the area of said fresh surface closely approximates ten times the cross-sectional area of said thin metal band.

4. A method of effecting a joint between the ends of thin metal bands which comprises scarfing the two ends to be joined by means of pressing each of said bands against a rigid surface with a chisel-head surface in such a manner that said bands are sheared and a scarfed surface results, the area of said scarfed surface being approximately ten times the cross-sectional area of said bands, then overlapping two such scarfed ends in such a manner that said scarfed surfaces are parallel and abutted, placing a thin strip of silver solder between the scarfed surfaces, then subjecting this juncture to sufficient heat to melt said silver solder and simultaneously to sufficient pressure to insure intimate contact of said silver solder with said scarfed surfaces, removing said heat and pressure, then compressing the resulting joint between opposing flat surfaces so that said joint is cold-formed and reduced in size to the dimensions of the joined bands, and finally trimming away any excess material at said joint.

5. A method of effecting a joint between the ends of thin metal bands which comprises scarfing the two ends to be joined by means of an apparatus which consists of an enclosed channel, a sturdy metal member capable of advancing and retracting in and being guided by said enclosed channel, a wedge-like or chisel-head surface on the forward face of said metal member, said chisel-head surface being of such design that the sloping sides meet in a straight-line crest which runs squarely with the shanks of said metal member, said crest or apex angle being of geometrical proportions such that to one side of said crest the surface slopes at an angle of 6–10° and on the opposite side of said crest the surface slopes at an angle between 25–30° from the surface of the cross section, a flat plate at the forward end of said channel which squarely and rigidly impedes the further advance of said chisel-head surface, slots positioned in opposite sides of said channel directly above and parallel to said flat plate which allow insertion of the metal band across the channel and flush against the surface of said flat plate, said metal band being oriented in such a direction by the slots that said chisel-head surface when contacted with the surface of said metal band spans the width of said metal band squarely, by transmitting a force through said metal member so that said chisel-head surface presses said metal band against said flat plate and shears the metal band so that a smooth, uniform, scarfed surface whose area closely approximates ten times the cross sectional area of said metal band results on the end of said metal band; then overlapping two such scarfed ends in such a manner that said scarfed surfaces are parallel and abutted; placing a strip of silver solder 0.003 inch thick between the scarfed surfaces; then subjecting this juncture to sufficient heat to melt said surface solder and simultaneously subjecting the juncture to sufficient pressure to insure intimate contact of said silver solder with said scarfed surfaces; removing said heat and pressure; then compressing the resulting joint between opposing flat surfaces so that said joint is cold-formed and reduced in size to the dimensions of the joined bands; and then trimming away any excess material at said joint.

6. A method of effecting a joint between the ends of thin metal bands which comprises scarfing the two ends to be joined by means of pressing each of said bands against a rigid surface with a chisel head surface in such a manner that said bands are sheared and a scarfed surface results, the area of said scarfed surface being approximately ten times the cross-sectional area of said bands, then overlapping two such scarfed ends in such a manner that said scarfed surfaces are parallel and abutted, placing a thin strip of fusible metal bonding material between the scarfed surfaces, then subjecting this juncture to sufficient heat to fuse said bonding material and simultaneously to sufficient pressure to insure intimate contact of said bonding material with said scarfed surfaces, removing said heat and pressure, and compressing the resulting joint between opposing flat surfaces so that said joint is cold formed and reduced in size to dimensions of the joined bands.

References Cited

UNITED STATES PATENTS

| | | | |
|---|---|---|---|
| 441,276 | 11/1890 | Bayles | 29—480 |
| 495,881 | 3/1893 | Emerson | 29—493 |
| 1,146,612 | 7/1915 | Carter | 29—477 |
| 2,429,119 | 10/1947 | Bloomfield | 29—477 |
| 2,697,954 | 12/1954 | Sowter | 29—470.1 |
| 2,932,884 | 4/1960 | Lyon | 29—481 |
| 3,032,871 | 5/1962 | Rohrberg et al. | 29—482 |

JOHN F. CAMPBELL, *Primary Examiner.*

L. J. WESTFALL, *Assistant Examiner.*